(12) United States Patent
Veit

(10) Patent No.: US 6,546,823 B1
(45) Date of Patent: Apr. 15, 2003

(54) SENSOR ARRANGEMENT

(75) Inventor: Eberhard Veit, Göppingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/647,750

(22) PCT Filed: Mar. 11, 2000

(86) PCT No.: PCT/EP00/02168

§ 371 (c)(1),
(2), (4) Date: Oct. 4, 2000

(87) PCT Pub. No.: WO00/58693

PCT Pub. Date: Oct. 5, 2000

(30) Foreign Application Priority Data

Mar. 27, 1999 (DE) ..................... 299 05 700 U

(51) Int. Cl.⁷ .............................................. F01B 25/26
(52) U.S. Cl. ...................................................... 73/866.5
(58) Field of Search ............................... 73/866.5, 756, 73/730, 493; 324/207.24, 207.25; 374/208

(56) References Cited

U.S. PATENT DOCUMENTS

| 4,541,284 A | * | 9/1985 | Guagliumi et al. ............. 73/756 |
| 4,659,988 A | * | 4/1987 | Goff et al. ............. 324/204.25 |
| 4,898,079 A | * | 2/1990 | Combette ..................... 73/730 |
| 5,127,747 A | * | 7/1992 | Hilby et al. ........... 324/207.25 |
| 5,179,956 A | * | 1/1993 | Harada et al. ................. 73/756 |
| 5,440,300 A |   | 8/1995 | Spillman, Jr. |
| 5,454,641 A | * | 10/1995 | Parker et al. ............... 374/308 |
| 5,575,563 A | * | 11/1996 | Chiu et al. .................. 374/208 |
| 5,707,151 A | * | 1/1998 | Parker et al. ............... 374/208 |
| 6,007,034 A | * | 12/1999 | Stoll et al. .................. 73/866.5 |

FOREIGN PATENT DOCUMENTS

| DE | 27 26 867 A1 | 1/1979 |
| DE | 28 05 355 A1 | 8/1979 |
| DE | 28 23 052 A1 | 11/1979 |
| DE | 33 44 108 A1 | 6/1985 |
| DE | 36 43 095 A1 | 7/1988 |
| DE | 92 10 726 U | 10/1992 |
| DE | 93 12 282 | 10/1993 |
| DE | 43 12 424 C2 | 10/1994 |
| DE | 44 30 770 A1 | 1/1996 |
| DE | 94 15 417 U1 | 1/1996 |
| DE | 297 17 492 U1 | 11/1997 |
| DE | 297 18 934 U1 | 12/1997 |
| DE | 197 39 012 A1 | 3/1999 |
| EP | 0 309 304 A1 | 3/1989 |

* cited by examiner

Primary Examiner—Robert Raevis
(74) Attorney, Agent, or Firm—Hoffmann & Baron, LLP

(57) ABSTRACT

A sensor arrangement, having at least one sensor (3) which is able to be so attached to the outer face of a carrying part (1) by means of an attachment means that the attachment means (2) fits around the carrying part (1) at least 180° of its peripheral extent. The sensor (3) is designed in the form of a non-separable, integral component of the attachment means (2).

20 Claims, 2 Drawing Sheets

SENSOR ARRANGEMENT

FIELD OF THE INVENTION

The invention relates to a sensor arrangement comprising at least one sensor, which may be so attached by means of an attachment means to the outside of a carrying part that the attachment means encompasses the carrying part for at least 180° of its peripheral extent.

BACKGROUND OF THE INVENTION

Such a sensor arrangement is for example disclosed in the German utility model number 29,717,492.2. Here an attachment means is provided as an attachment ring or attachment clip, which is able to be secured coaxially to the outer periphery of a carrying part formed by the housing of a fluid power cylinder and possesses a holding groove, into which a sensor is fitted in a detachable fashion. The sensor serves for sensing the position of a piston, which is arranged in a moving manner in the interior of the carrying part, of the fluid power cylinder.

The exact adjustment of the sensor arrangement on the outer periphery of the carrying part is relatively complex in this known case. On the one hand the attachment means must be fixed in a suitable position on the carrying part and on the other hand it is necessary to secure the sensor in a suitable relative position on the carrying part. A further point is that the known sensor arrangement makes extremely large dimensions necessary in the radial direction in order to render possible reliable attachment of the sensor on the attachment means.

OBJECTS AND SUMMARY OF THE INVENTION

One object of the present invention is to provide a sensor arrangement which possesses a simpler structure and may be fitted in place more readily.

In order to achieve this aim there is the provision that the sensor is designed in the form of a non-separable, integral component of the attachment means.

It is in this manner that the association between the sensor and the attachment means is predetermined as a manufacturer's setting so that the user merely has to fix the attachment means at the desired position of a carrying part in order to position the sensor in a manner in accordance with requirements. The attachment means and the sensor then constitute a non-separable integral unit, which during production makes possible a reduction in costs and simultaneously allows keeping to very compact dimensions. Although the sensor arrangement is able to be employed completely universally, it is particularly advantageous in connection with detecting the position of the drive unit of a linear drive adapted to be actuated by fluid force and/or electrically, if the sensor arrangement may be secured in a favorable manner on the outer periphery of the housing of the linear drive. It is convenient for the attachment means to be able to be clamped at a suitable position on the carrying part and so may be extremely adaptably reset in position.

Advantageous further developments of the invention will appear from the dependent claims.

In the case of an advantageous design the attachment means is at least partly and preferably totally designed to be bendingly flexible, it furthermore being possible for it to have resiliently elastic properties to customize it to the needs of the particular user. More particularly in this connection it is an advantage for the attachment means to consist of plastic material, which more especially permits an extremely simple integration of the sensor directly during the production of the attachment means.

The attachment means may be designed in the form of an attachment clip, which fits around the carrying part, when mounted on same, along part of the periphery, the necessary holding force being able to be produced for instance by a detent or snap action connection. Thus there is the possibility of designing the attachment clip in such a flexibly elastic fashion that it may be snap fitted on the carrying part after firstly opening it out and slipping it in place. This design is more particularly to be preferred when the carrying part is not accessible over its full periphery.

In a further design there is a provision such that the attachment means is designed in the form of an attachment ring, which surrounds the carrying part completely when mounted thereon. It is in this manner that a particularly reliable attachment on the carrying part is rendered possible. In order to provide the necessary clamping force the attachment means may be interrupted at a point on its periphery with the formation of two clamping arms, the clamping arms being able to be so braced in relation to one another using a suitable clamping means, which for instance is designed in the form of a detent means, that the attachment means surround the carrying part with a firm seat thereon. The attachment means may in this case more particularly be designed like a hose clip.

More particularly when the sensor means is to be suitable for selective attachment to carrying parts of different diameter, it is an advantage if not only the attachment means itself but also furthermore the sensor integrated in it possesses bendingly flexible properties and accordingly may be adapted to surfaces of carrying parts with different degrees of curvature without any chance of damage. The sensor may for example have a bendingly flexible printed circuit board having the necessary electrical and electronic components.

In the case of a further convenient design of the sensor arrangement there is a provision such that the sensor is in the form of a part incast in the material of the attachment means, that is to say it is practically incast in the attachment means. This offers the possibility of so embedding the sensor in the attachment means that it is at least mostly surrounded by the material of the attachment means and is also protected against mechanical effects.

More particularly when the part to be provided with the sensor arrangement is subject to substantial vibrations, it is an advantage for the attachment means to be provided with a securing element, projecting from the side facing the carrying part, which element may be caused to bite into the surface of the carrying part at least to a small extent in order, in addition to the friction connection produced by the attachment means, to get a securing action based on interlocking contact.

In the following the invention will be described with reference to the drawing.

DETAILED DESCRIPTION OF THE PREFERRED EMBODIMENTS

Figure 1:
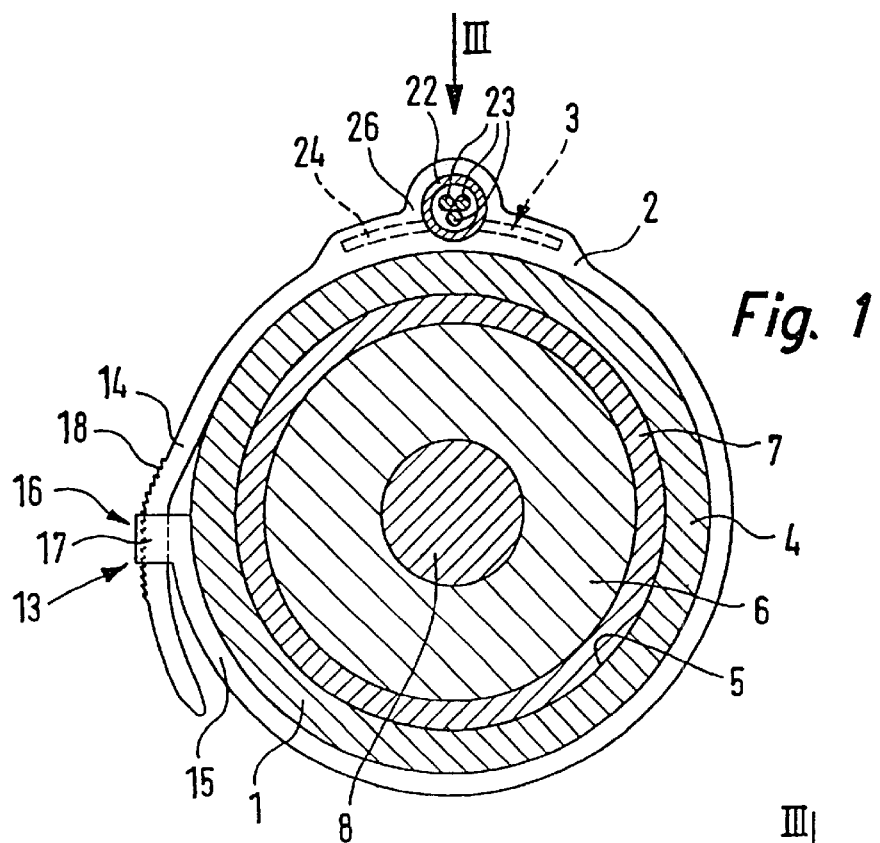
FIG. 1 shows a preferred embodiment of the sensor arrangement in the state mounted on a fluid power linear drive, all seen in a cross section taken on the line I—I of FIG. 2.

The figures respectively show a carrying part 1, on whose outer side a sensor 3 is attached with the aid of an attachment means 2.

In the case of the embodiment illustrated the carrying part 1 is constituted by a housing part 4, which defines an interior space 5, in which a component 6 is arranged for motion in relation to the carrying part 1. The component 6 is provided with an attachment element 7, or it may directly form such an actuating element 7, which is in a position of tripping the sensor 3 without making contact, when in the proximity thereof.

The further explanation of the working examples will be with reference to a preferred application of the sensor arrangement in connection with detecting the relative position between the drive part and the housing of a linear drive, such linear drive being more particularly operated by fluid power. The housing part 4 is in this case designed in a tubular manner and in the interior space 5 receives a piston forming the above mentioned component 6, such piston being kinematically coupled with an output drive part 8, for instance in the form of a rod, via which the movement of the component 6 may be used for driving external loads. The component 6 divides up the interior space 5 axially and with a sealing action into two working spaces 12 and 13, of which at least one is able to be acted upon by a fluid pressure medium in order to shift the component 6 in relation to the carrying part 1 and the sensor 3 secured to same. The actuating element 7 may for instance be a permanent magnet, whose magnetic field is able to so actuate the sensor 3 that same provides at least one signal, by means of which the immediate position of the component 6 may be found.

Figure 3:
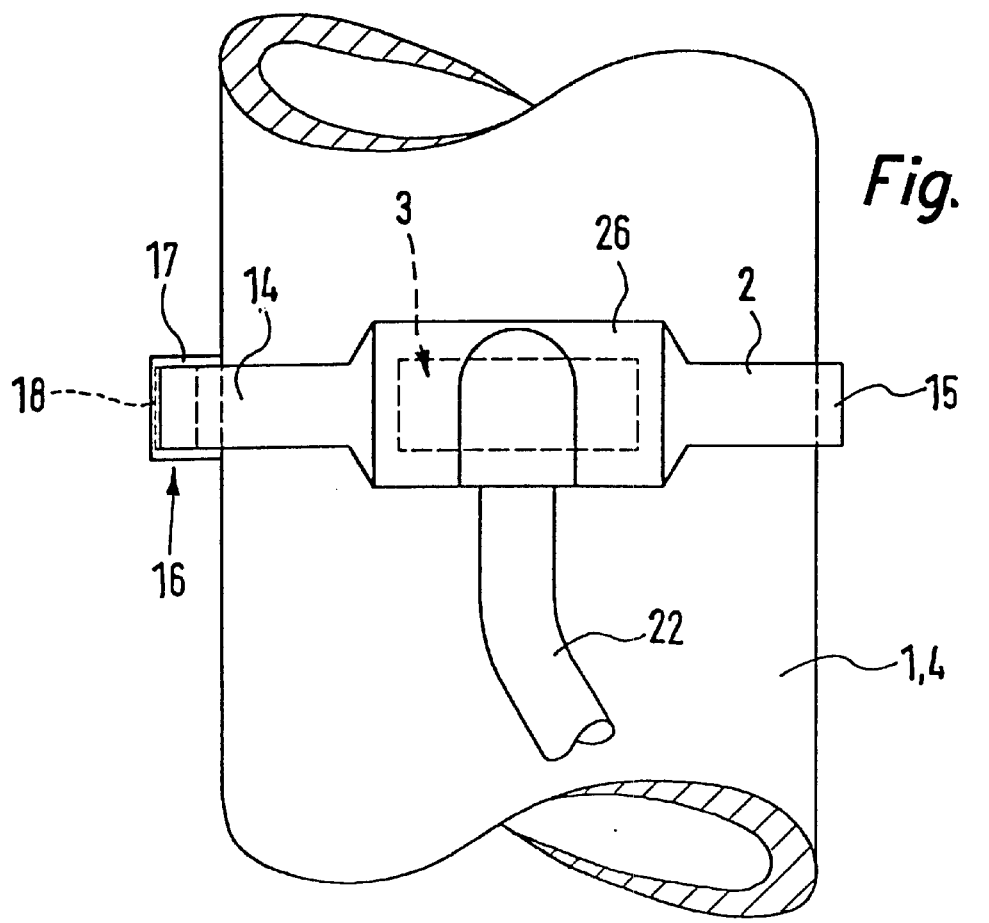
FIG. 3 shows the arrangement of FIGS. 1 and 2 in a radially orientated plan view looking in the direction of the arrow III in FIGS. 1 and 2.
Figure 4:
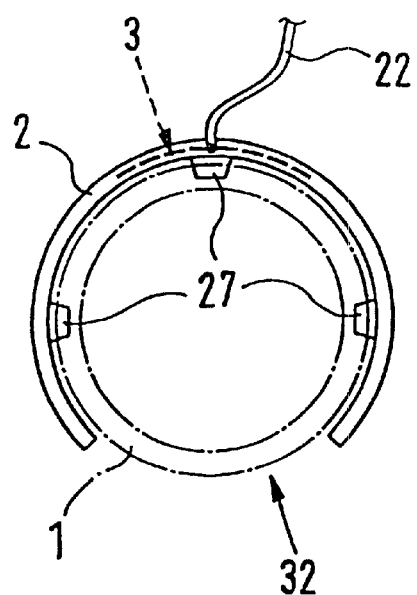
FIG. 4 is a highly diagrammatic view of a further possible design of the sensor arrangement.

As shown in FIGS. 1, 3 and 4, the carrying part 1, which in the present case is constituted by the housing part 4, is preferably externally cylindrical and more particularly circularly so.

Within the sensor arrangement the sensor 3 constitutes a non-separable integral component of the attachment means 2, which is so arranged on the cylindrical outer face 12 of the carrying part 1 that it extends over at least 180° of the periphery of the carrying part 1. It is in this manner that the sensor arrangement may on the one hand be produced with extremely simply compact dimensions and on the other hand may be extremely simply and reliably secured to the carrying part 1.

Figure 2:
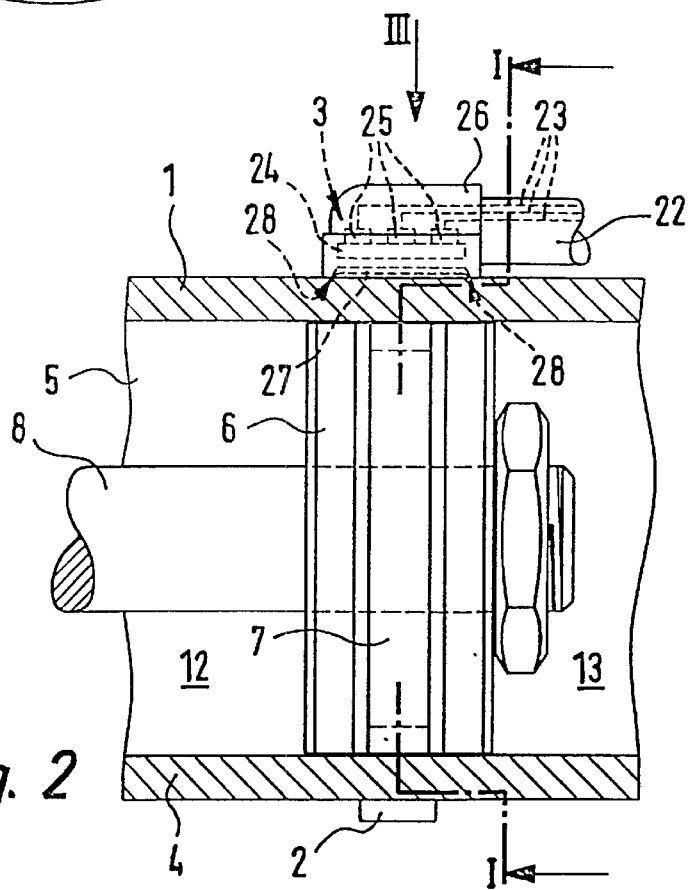
FIG. 2 shows the arrangement of FIG. 1 in a side view and partially in longitudinal section.

In the illustrated working embodiment of FIGS. 1 through 3 the attachment means 2 is designed as an attachment ring, which completely surrounds the carrying part 1 when fixed to it and is frictionally engaged with the outer face 12 of the carrying part 1 so that it is secured in relation to the carrying part 1 without any possibility of relative movement.

As regards details the attachment means 2 in the working example is all made of plastic material and has bendingly flexible properties for the whole of its length in the peripheral direction of the carrying part 1. Prior to fitting to the carrying part 1 the ring structure of the attachment means 2 is interrupted at one point so that an elongated, band-like part is produced which is so laid around the carrying part 1 for fitting that the two terminal regions, in what follows referred to as clamping arms 14 and 15, assume a position adjacent to each other in a closure region 13. By means of a clamping means 16, which is placed in the closure region 13, it is possible for the clamping arms 14 and 15 to be connected together closing the ring structure and to be drawn together reducing the cross section enclosed by the attachment means 2 so that the attachment means 2 is drawn tight around the carrying part 1. The fitting in place of the attachment means 2 may be thought of as being like putting on a wrist watch.

Owing to the flexibility of the attachment means 2 selective mounting on carrying parts 1 of different external diameter is possible, the attachment means 2 automatically adapting itself to the different degrees of curvature and being able to make snug engagement with the outer face 12.

The clamping means 16 of the working example is designed in the form of a detent connection means, the one clamping arm 15 being provided with an eye 17, through which the other clamping arm 14, may be threaded, which is provided with a rack 18. Providing the rack 18 extends over a sufficient length of the attachment means 2, it is possible for the latter to be fixed in place in an extremely adaptable manner on carrying parts of different diameter. If the clamping arm 14 provided with the rack 18 should project too far after fitting, its terminal section may be trimmed back with a shears to a length which does not get in the way.

The sensor 3 is in all working examples so embedded in the material of the attachment means 2 that it is completely included in same for the whole of its periphery. Manufacture takes place by injection molding for example, the sensor 3 being placed in a mold and incast in the plastic material of the attachment means 2. The incast design furthermore possesses the advantage, besides that of extremely simple production, that there is an optimum protection of the sensor 3 against damage from the outside.

Reference numeral 22 indicates a cable leading away from the sensor whose electrical conductors 23 are in electrical contact with the sensor 3 in the interior of the attachment means 2. It will be clear that instead of the cable output connection it would also be possible to have an electrical interface for the connection of lines leading to other equipment, such means more especially including a plug connector.

In order to prevent impairment of flexibility of the attachment means 2 the sensor 3 in the working example is also bendingly flexible. For instance, it comprises a bendingly flexible printed circuit board 24, which bears the necessary electrical and/or electronic components 25 and which may be bent in accordance with the set radius of the attachment means 2. As a printed circuit board it is here convenient to employ a foil-like thin component.

The attachment means 2 may have a more or less constant width along its entire length. In the illustrated working embodiment however the length sections constituting the clamping arms 14 and 15 are relatively narrow in form, whereas the receiving section 26 comprising the sensor 3 is made somewhat wider in order to take into account the dimensions of the sensor 3.

The clamping means 16 may be designed either as a separable or as a non-separable element. It could also involve the provision of a screw connection. However, the connection should be so designed that the two clamping arms 14 and 15 may be steplessly reset in the peripheral direction of the carrying part 1 in relation to one another in order to provide for an adaptation to the external diameter of the carrying part 1 and to apply the necessary clamping force.

It is more especially in the case of use of the sensor means in connection with carrying parts 1, which in operation are subject to strong vibration, that it may be worthwhile providing additional securing means, which hold the position of the attachment means 2 in relation to the carrying part 1, and more particularly in the longitudinal direction thereof. FIG. 2 shows a possible design for this purpose, the securing element 27, preferably consisting of metal being embedded in the material of the attachment means 2, such securing element 27 being provided with one or more tooth-like spurs 28 spread out along the inner face of the attachment means facing the carrying part 1, such projecting spurs being to be caused to bite into the material of the carrying part to produce an additional interlocking action.

In the case of working example illustrated in FIG. 4 of the sensor arrangement the attachment means 2 extends in the mounted state over only part of the periphery of the carrying part 1, the carrying part 1 being encompassed for at least 180° peripherally by the attachment means 2. The angle of encompassment is in the working example larger than 180° and is for instance of the order of 270°, this permitting a simple anchoring of the attachment means on the carrying part 1.

In the illustrated working embodiment of FIG. 4 the attachment part 2 is designed like a clip, it having resiliently elastic properties which render possible a widening of the attachment means 2 at its open peripheral section 32 elastically.

The attachment means 2 is consequently so designed that in the non-fitted state it assumes a clip or yoke configuration, the cross section delimited by it being smaller than that of the carrying part 1. During fitting in position the attachment means 2 splayed out at its open peripheral section 32 and with this open peripheral section 32 to the fore it is slipped onto the carrying part 1 to straddle same. The attachment means 2 is now under a constant biasing action, this meaning that it firmly embraces the carrying part 1.

In the case of this embodiment as well it is possible for one or more securing elements 27 to be provided which fit into the carrying part 1 in the set relative position between the attachment means 2 and the carrying part 1. For this purpose it would also be possible for example to provide one or more preset recesses in the carrying part 1, into which the securing elements 27 of the attachment means 2 could fit.

FIG. 4 will serve to make it clear that the attachment means 2 may have a constant width along its full length, but at least at its external surface facing radially away from the carrying part may have a continuous form without any steps.

Moreover, it is possible for the attachment means 2 to be so designed that in the receiving section 26 containing the sensor 3 it has a greater degree of stiffness than in the remaining sections of the length thereof. The design in this respect will be substantially dependent on what diameter range of the carrying parts 1 is to be covered with one and the same attachment means 2.

What is claimed is:

1. A sensor arrangement, comprising at least one sensor, which by means of an attachment means may be so attached to the outside of a carrying part that the attachment means encompasses the carrying part for at least 180° of its peripheral extent, wherein the sensor is a bendingly flexible printed circuit board, the flexible printed circuit board being a non-separable integral component of the attachment means.

2. The sensor arrangement as set forth in claim 1, wherein the attachment means is at least partially bendingly flexible and has resiliently elastic properties.

3. The sensor arrangement as set forth in claim 1, wherein the attachment means consists of plastic material.

4. The sensor arrangement as set forth in claim 1, wherein the attachment means is an attachment clip surrounding the carrying part in the condition mounted thereon for only part of the periphery, which clip is able to be fixed in place by means of a detent or snap action connection in the carrying means.

5. The sensor arrangement as set forth in claim 1, characterized in that the attachment means (2) is designed in the form of an attachment ring completely surrounding the carrying part (1) and able to be drawn tight thereon.

6. The sensor arrangement as set forth in claim 5, characterized in that the attachment means (2) comprises two clamping arms (14 and 15) able to be to be fixedly joined together by a bracing means (16).

7. The sensor arrangement as set forth in claim 6, wherein the bracing means is a detent connecting means.

8. The sensor arrangement as set forth in claim 1, wherein the attachment means is a band.

9. The sensor arrangement as set forth in claim 1, wherein the sensor comprises electronic components.

10. The sensor arrangement as set forth in claim 1, wherein the sensor is surrounded by the material of the attachment means at least to a major extent.

11. The sensor arrangement as set forth in claim 1, wherein the sensor is molded within the attachment means.

12. The sensor arrangement as set forth in claim 1, characterized in that the attachment means (2) possesses an essentially constant width along at least approximately its entire length.

13. The sensor arrangement as set forth in claim 1, characterized in that the attachment means (2) possesses an essentially constant thickness along at least approximately its entire length.

14. The sensor arrangement as set forth in claim 1, wherein the sensor is a position detecting means, which is responsive to an attachment element arriving in its field of action without making contact.

15. The sensor arrangement as set forth in claim 1, wherein the attachment means is adapted for attachment to a carrying part having a cylindrical outer face.

16. The sensor arrangement as set forth in claim 1, characterized in that the carrying part (1) is constituted by a housing part (4).

17. The sensor arrangement as set forth in claim 1, wherein the carrying part is a tubular housing part of a linear drive.

18. The sensor arrangement as set forth in claim 1, further comprising at least one securing element projecting past the attachment means on the side facing the carrying part.

19. A sensor arrangement for detecting a position of a drive part within a tubular housing of a linear drive, the sensor arrangement comprising:

a flexible band adapted to be secured around a substantial portion of an outer surface of the tubular linear drive housing; and a sensor integrally molded within said flexible band, said sensor comprising a flexible printed circuit board adapted to conform to the outer surface of the tubular linear drive housing together with said flexible band.

20. A sensor arrangement as defined in claim 19, wherein said flexible band comprises a rack of teeth at a first end thereof and an eye at an opposite end thereof, said rack of teeth being adjustably engageable with said eye thereby reducing the cross section enclosed by said band to secure said band around an entire outer surface of the tubular linear drive housing.

* * * * *